(12) United States Patent
Choi

(10) Patent No.: US 10,969,921 B2
(45) Date of Patent: Apr. 6, 2021

(54) DISPLAY DEVICE INCLUDING TOUCH SENSOR AND METHOD FOR DRIVING TOUCH SENSOR

(71) Applicant: LG Display Co., Ltd., Seoul (KR)

(72) Inventor: Yongkyun Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 170 days.

(21) Appl. No.: 16/121,413

(22) Filed: Sep. 4, 2018

(65) Prior Publication Data

US 2019/0073080 A1    Mar. 7, 2019

(30) Foreign Application Priority Data

Sep. 5, 2017  (KR) .......................... 10-2017-0113580

(51) Int. Cl.
*G06F 3/045* (2006.01)
*G06F 3/041* (2006.01)

(52) U.S. Cl.
CPC .......... *G06F 3/045* (2013.01); *G06F 3/04164* (2019.05); *G06F 2203/04105* (2013.01)

(58) Field of Classification Search
None
See application file for complete search history.

(56) References Cited

U.S. PATENT DOCUMENTS

2008/0271933 A1\* 11/2008 Morimoto ............... G01L 5/228
178/18.05
2018/0196568 A1\*  7/2018 McCalley ............... G06F 3/044

\* cited by examiner

*Primary Examiner* — Brian M Butcher
(74) *Attorney, Agent, or Firm* — Seed IP Law Group LLP

(57) ABSTRACT

Embodiments of the present disclosure may provide: a display device including a touch sensor including a first sensor including at least three first sensing signal lines, each of which is configured to output a first sensing signal according to a first driving signal, and a second sensor which includes a driving signal line and a second sensing signal line and is configured to output a second sensing signal through the second sensing signal line, a second driving signal being applied to the driving signal line, wherein the first driving signal is a signal applied through the driving signal line of the second sensor; and a method for driving a touch sensor.

9 Claims, 8 Drawing Sheets

DISPLAY DEVICE INCLUDING TOUCH SENSOR AND METHOD FOR DRIVING TOUCH SENSOR

CROSS REFERENCE TO RELATED APPLICATION

This application claims priority from Korean Patent Application No. 10-2017-0113580, filed on Sep. 5, 2017, which is hereby incorporated by reference for all purposes as if fully set forth herein.

BACKGROUND

Technical Field

Embodiments of the present disclosure relate to a display device including a touch sensor and a method for driving a touch sensor.

Description of the Related Art

With the development of the information society, display devices for displaying images are being increasingly required in various forms, and various types of flat panel display devices, such as liquid crystal display (LCD) devices, plasma display devices, and organic light emitting display (OLED) devices, are utilized.

In addition, a display device can be operated by receiving an input of a user's command through various input devices such as a keyboard and a mouse. A touch sensor for enabling a user to input a command intuitively and conveniently by touching a screen has been developed as an input device of the display device. The touch sensor is disposed on a screen of the display device, and a user touches a specific point of the screen of the display device, so that the display device can receive an input of a user's command.

The touch sensor includes a resistive film type touch sensor, a capacitance type touch sensor, or the like. The capacitance type touch sensor has a disadvantage in that a touch cannot be sensed when a touch object such as a finger or a stylus pen is wet with moisture.

However, a mobile device has been used in various environments, and waterproof performance of the mobile device has been improved especially for use in water. However, although the waterproof performance is improved, if a touch cannot be recognized underwater, the mobile devices become useless. Therefore, a scheme is required to sense a touch in an environment containing a lot of moisture.

In addition, recently, a scheme of sensing a touched force and applying the force to various applications has been derived. A flexible display device can be bent by a force applied to a touch point, and thus a scheme of sensing a touch point corresponding to the flexible property is required to be derived.

BRIEF SUMMARY

An aspect of embodiments of the present disclosure is to provide a display device including a touch sensor capable of recognizing a touch in a humid environment or an underwater environment, and a method for driving a touch sensor.

Another aspect of embodiments of the present disclosure is to provide a display device including a touch sensor capable of sensing a touch force in a flexible display panel, and a method for driving a touch sensor.

Another aspect of embodiments of the present disclosure is to provide a touch sensor having a structure capable of effectively sensing a touch position and a touch force, a display device including the touch sensor, and a method for driving a touch sensor.

In accordance with an aspect, embodiments of the present disclosure may provide a touch sensor including: a first sensor including at least three first sensing signal lines, each of which is configured to output a first sensing signal according to a first driving signal; and a second sensor including a driving signal line and a second sensing signal line and configured to output a second sensing signal through the second sensing signal line, a second driving signal being applied to the driving signal line, wherein the first driving signal is a signal applied through the driving signal line of the second sensor.

In accordance with an another aspect, embodiments of the present disclosure may provide a display device including: a sensor unit including a first sensor including at least three first sensing signal lines, each of which is configured to output a first sensing signal according to a first driving signal, and a second sensor including a driving signal line and a second sensing signal line and configured to output a second sensing signal through the second sensing signal line, a second driving signal being applied to the driving signal line; a touch drive circuit configured to transfer the first driving signal to the first sensor through the driving signal line, apply the second driving signal to the second sensor, and receive the first sensing signal and the second sensing signal from the first sensing signal line and the second sensing signal line; a touch controller configured to control the touch drive circuit and generate position information and force magnitude information relating to a touch point by using the first sensing signal and the second sensing signal; and a display panel disposed on the sensor unit and configured to display an image.

In accordance with an another aspect, embodiments of the present disclosure may provide a display device including: a substrate; a spacer having a hollow space and disposed at an edge of the substrate; a first conductive film including a first conductive wiring patterned and formed on the substrate, and a second conductive wiring patterned and separated from the first conductive wiring; a second conductive film disposed on the spacer, spaced apart from the first conductive film by a predetermined distance, and connected to at least three second sensing signal lines; and a display panel disposed on the second conductive film.

In accordance with an another aspect, embodiments of the present disclosure may provide a method for driving a touch sensor, the method including: transferring a first driving signal to a first sensor from a second sensor in response to a force applied to a touch point, and receiving a first sensing signal from the first sensor in response to the first driving signal; obtaining position information relating to the touch point in response to the first sensing signal; transferring a second driving signal to the second sensor and receiving, from the second sensor, a second sensing signal corresponding to the touch point in response to the second driving signal; and obtaining force magnitude information corresponding to the force applied to the touch point in response to the second sensing signal.

Embodiments of the present disclosure may provide a display device including a touch sensor capable of recognizing a touch in a humid environment, and a method for driving a touch sensor.

Embodiments of the present disclosure may provide a display device including a touch sensor capable of sensing a touch force in a flexible display panel, and a method for driving a touch sensor.

Embodiments of the present disclosure may provide a touch sensor having a structure capable of effectively sensing a touch position and a touch force, a display device including the touch sensor, and a method for driving a touch sensor.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Figure 1:
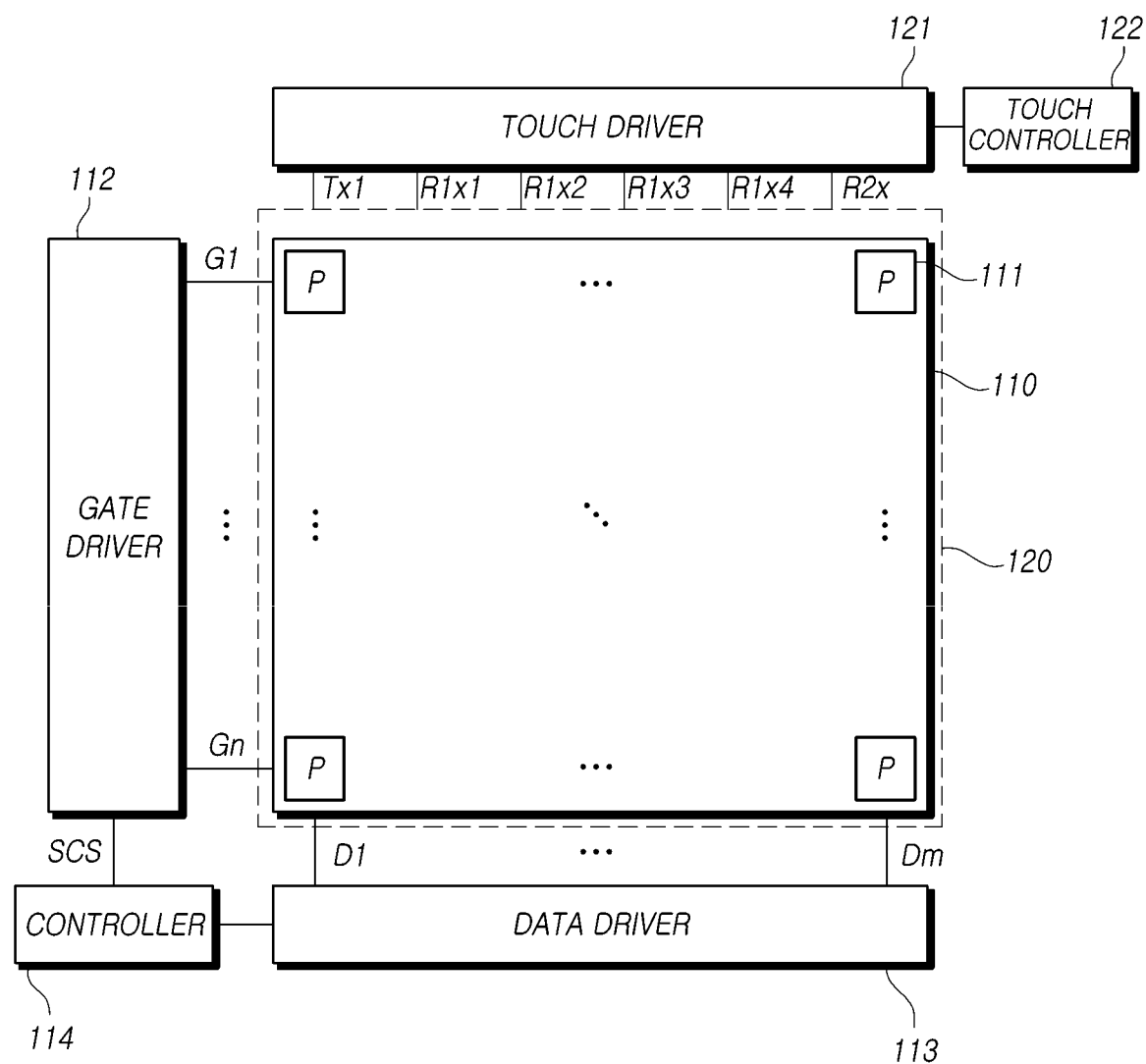
FIG. 1 is a structural view illustrating a display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order, sequence, or the number of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a structural view illustrating a display device according to embodiments of the present disclosure.

Referring to FIG. 1, a display device 100 may include a display panel 110, a sensor unit 120, a touch driver 121, and a touch controller 122 configured to control the touch driver 121.

The display panel 110 may include a plurality of gate lines (G1, . . . , Gn) and a plurality of data lines (D1, . . . , Dm) which intersect to each other. The display panel 110 may include a plurality pixels 101 which are formed to correspond to a region in which the plurality of gate lines (G1, . . . , Gn) and the plurality of data lines (D1, . . . , Dm) intersect to each other. In addition, a gate driver 112 which transfers a gate signal may be connected to the plurality of gate lines (G1, . . . , Gn) of the display panel 110, and a data driver 113 which transfers a data signal may be connected to the plurality of data lines (D1, . . . , Dm) of the display panel 110. Further, a controller 114 which controls the gate driver 112 and the data driver 113 and transfers an image signal to the data driver may be connected. The display panel 110 is shown as being a separate component from the gate driver 112, the data driver 113, and the controller 114, but is not limited thereto. The gate driver 112 and the data driver 113 may be configured into an integrated circuit. Although the number of the data driver 113 and the number of the gate driver 112 are shown as one, respectively, the number of the data driver 113 and the number of the gate driver 112 are not limited thereto, but may be plurally implemented respectively according to the size and/or resolution of the display panel 110. In addition, the present disclosure is not limited to the illustrated configuration including components for applying a signal to the display panel 110.

The display panel 110 may be formed using a flexible substrate. The display panel may be flexible by using a flexible substrate. The flexible substrate may be formed by using an organic light emitting element in which a plurality of pixels are deposited on a substrate formed of a plastic material such as polyethylene terephthalate (PET), and an upper portion of the substrate is sealed with a sealing substrate. However, the present disclosure is not limited thereto.

The sensor unit 120 may include a first sensor 120a which receives a first driving signal through a driving signal line and outputs at least three first sensing signals corresponding to a position of a touch point through first sensing signal lines (R1x1, R1x2, R1x3, and R1x4), and a second sensor 120b which receives a second driving signal through the driving signal line to output a second sensing signal corresponding to a force with respect to the touch point through a second sensing signal line (R2x), and comes into contact with the first sensor 120a in the touch point.

When the display panel 110 is touched by a finger, a stylus pen, or the like, the sensor unit 120 may generate position information corresponding to a touched point on the display panel 110 and force magnitude information corresponding to a force applied to the display panel 110 at the time of a touch. The sensor unit 120 may generate position information and force magnitude information in a resistive film manner. The resistance film manner may mean a manner of sensing using a change in magnitude of resistance. Therefore, the sensor unit 120 may generate position information and input information by measuring a resistance value even when the display device 100 is used underwater or is touched by using a finger, a stylus pen, or the like with moisture. Therefore, a touch can be recognized in a humid environment or an underwater environment.

Since the display panel 110 can be flexible, when the flexible display panel 110 is touched, a part of the display panel 110, corresponding to a touch point, is bent by a force generated by the touch, and the sensor unit 120 can sense the bending. Therefore, the sensing unit 120 can recognize position information and force magnitude information relating to a touch point in a flexible substrate by using the resistive film manner.

The touch driver 121 may transfer a driving signal through a driving signal line (Tx). Among driving signals, a driving signal output from the touch driver 121 for sensing a touch point may be referred to as a first driving signal, and a driving signal output for sensing a force generated at a touch point at the time of a touch may be referred to as a second driving signal. The touch driver 121 may output the first driving signal and then output the second driving signal.

The touch controller 122 may control the touch driver 121 to generate position information and force magnitude information relating to a touch point by using the first sensing signal and the second sensing signal. The first sensing signal transferred from the touch driver to the touch controller 122 may be four sensing signals independently transferred from four sensing signal lines, and the four sensing signals may be used to sense position information of a touch point. The force magnitude information may be intensity of a signal transferred from the second sensing signal or the like. Intensity of the second sensing signal may correspond to magnitude of a voltage of the second sensing signal. Further, the touch controller 122 may control the touch driver 121 to allow the touch driver 121 to output a driving signal.

The driving signal may include a first driving signal and a second driving signal. In relation to the driving signal, the first driving signal may be generated in the touch driver 121 under a control of the touch controller 122 and then the second driving signal may be generated. However, the present disclosure is not limited thereto. The display panel 110 may have a predetermined area and may be pressed with a different degree according to a position where a force on the display panel 110 is applied even when the same force is applied. Accordingly, after a position of the display panel 110, corresponding to a touch point, is first calculated by the first driving signal a magnitude of the force applied to the touch point may be calculated more accurately by using the calculated position information and the force magnitude information obtained based on the second sensing signal. That is, a sensing signal obtained by sensing a force applied at the time of a touch may be corrected using the position information relating to the touch point, and thus the force magnitude may be more accurately calculated.

Figure 2:
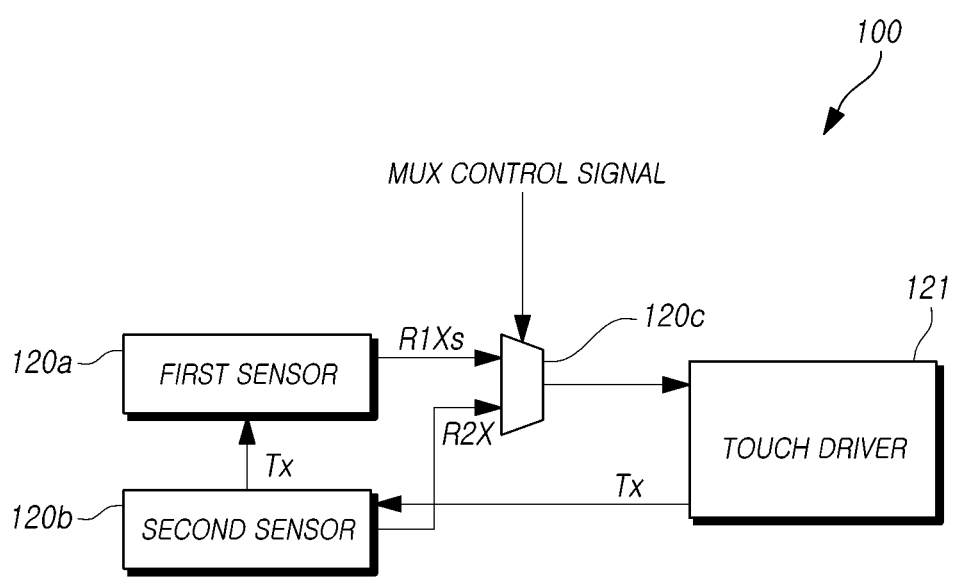
FIG. 2 is a structural view illustrating a display device according to embodiments of the present disclosure.

FIG. 2 is a structural view illustrating a display device according to embodiments of the present disclosure.

Referring to FIG. 2, a display device 100 may include a display panel 110 (not shown in FIG. 2 for simplicity), a first sensor 120a which senses position information relating to a touch point in which the display panel 110 is touched, and a second sensor 120b which senses a force applied to the touch point while the display panel 110 is touched. In addition, the display device 100 may include a touch driver 121 which transfers a driving signal to the first sensor 120a and the second sensor 120b and receives a sensing signal corresponding to the driving signal, and a touch controller 122 (not shown in FIG. 2 for simplicity) which controls the touch driver 121 and generates position information and force magnitude information relating to a touch point by using a received sensing signal.

The first sensor 120a and the second sensor 120b may be disposed under the display panel 110. In addition, the first sensor 120a and the second sensor 120b may be disposed to overlap with each other under the display panel 110. For example, the first sensor 120a may be positioned over the second sensor 120b in an overlapping arrangement. The overlap may mean that the first sensor 120a and the second sensor 120b overlap with each other on the same transparent surface. When a user touches the display panel 110 using a finger, a stylus pen, or the like, the first sensor 120a may be connected to the second sensor 120b in a region corresponding to a touch point by a force applied to the touch point in which the display panel 110 is touched. The connection may include that the first sensor 120a is in direct contact with the second sensor 120b or is connected to the second sensor 120b through a predetermined conductor. The first sensor 120a may sense position information relating to a region where the first sensor 120a and the second sensor 120b are in contact with each other. Further, the second sensor 120b may output a second sensing signal corresponding to a force applied when the first sensor 120a and the second sensor 120b are in contact with each other. The second sensing signal may be generated when the first sensor 120a and the second sensor 120b are in contact with each other. When the second sensing signal is output, it may be determined that a force greater than a predetermined force magnitude is applied to the display panel 110. Further, intensity of the second sensing signal may be changed corresponding to a force applied to a touch point.

The first sensor 120a may output a sensing signal corresponding to a driving signal through a first sensing signal line (R1Xs). The second sensor 120b may receive the driving signal through a driving signal line (Tx). First, a user can touch the display panel 110 in a state where the driving signal is transferred through the driving signal line (Tx). In relation to the driving signal, a first driving signal may be transferred and then a second driving signal may be transferred. When the first driving signal is transferred through the driving signal line (Tx) and the first sensor 120a and the second sensor 120b are in contact with each other, the first driving signal transferred to the second sensor 120b may be transferred to the first sensor 120a. The first sensor 120a may output a first sensing signal corresponding to the first driving signal transferred through the second sensor 120b. When the second driving signal is transferred through the driving signal line (Tx) in a state where a force applied at the time of a touch is maintained, the first sensor 120a and the second sensor 120b are maintained in contact with each other and the second sensor 120b may output a second sensing signal including force magnitude information corresponding to the contact in response to the second driving signal. When the first sensing signal is output, the second sensor 120b may fail to output the second sensing signal, and when the second sensing signal is output, the first sensor 120a may fail to output the first sensing signal.

The first sensing signal may be output through first sensing signal lines R1Xs (for example, four first sensing signal lines R1x1, R1x2, R1x3, and R1x4) connected to the first sensor 120a, and the second sensing signal may be output through a second sensing signal line (R2x) connected to the second sensor 120b. In this case, when a first driving signal is transferred, the first sensing signal lines R1Xs (R1x1, R1x2, R1x3, and R1x4) may be connected to the touch driver 121 and the second sensing signal line (R2x) may be opened and not connected to the touch driver 121. Therefore, the first driving signal may be transferred to the first sensor 120a, and the first sensor 120a may output a first sensing signal corresponding to the first driving signal.

In addition, when a second driving signal is transferred, the first sensing signal lines (R1x1, R1x2, R1x3, and R1x4) may be opened and not connected to the touch driver 121 and the second sensing signal line (R2x) may be connected to the touch driver 121. Therefore, the second driving signal is transferred from the second sensor 120b to the second sensing signal line (R2x), and the second sensor 120b may output a second sensing signal corresponding to the second driving signal.

In order to selectively connect the first sensing signal lines R1Xs (R1x1, R1x2, R1x3, and R1x4) and the second sensing signal line (R2x) to the touch driver 121 as described above, the first sensing signal lines (R1x1, R1x2, R1x3, and R1x4) and the second sensing signal line (R2x) may be connected to the touch driver 121 through a mux 120c. The touch controller 122 may output a mux control signal, and the mux 120c may allow the first sensing signal lines (R1x1, R1x2, R1x3, and R1x4) or the second sensing signal line (R2x) to selectively connect to the touch driver 121 in response to the output mux control signal. The selective connection of the first sensing signal lines (R1x1, R1x2, R1x3, and R1x4) or the second sensing signal line (R2x) is not limited thereto.

Figure 3:
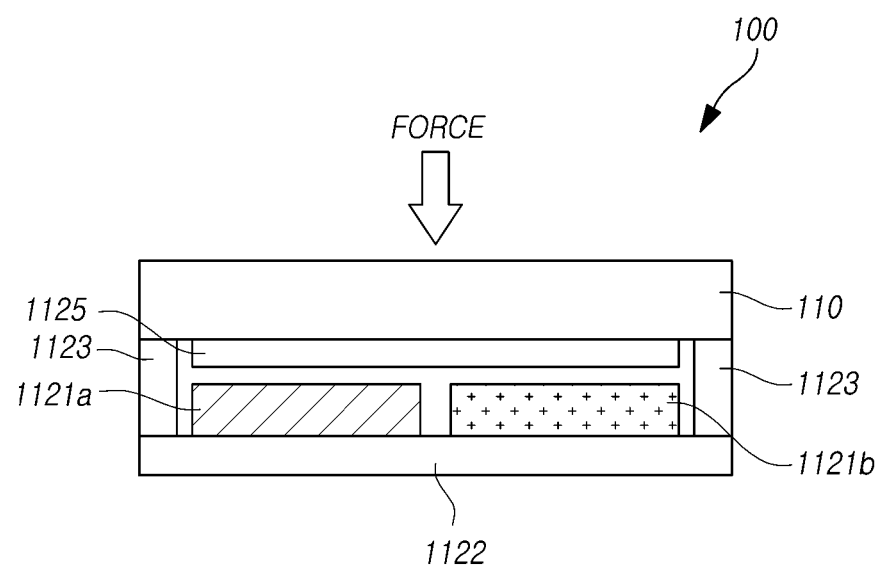
FIG. 3 is a cross-sectional view illustrating a display device according to embodiments of the present disclosure.
Figure 4:
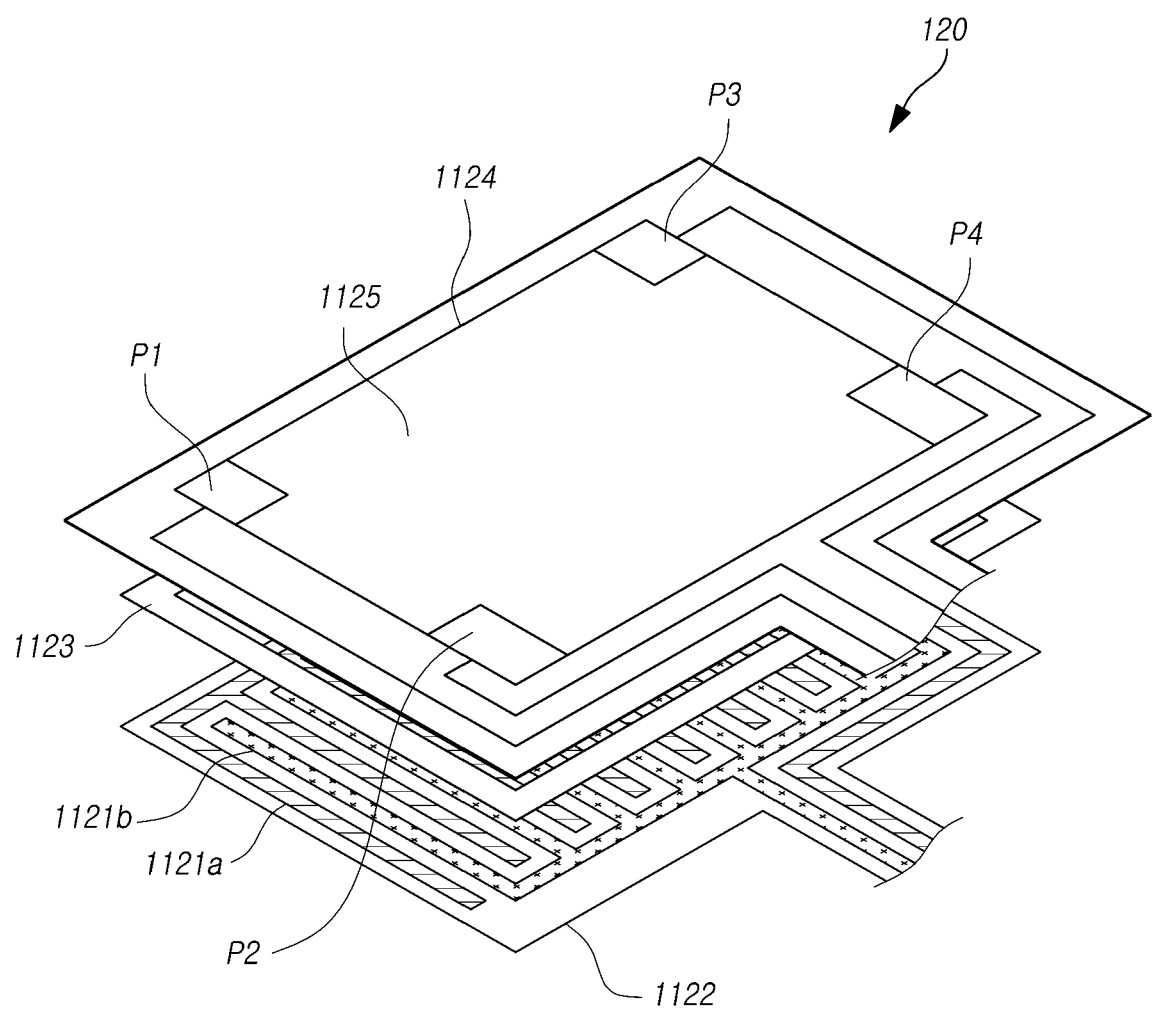
FIG. 4 is an exploded perspective view illustrating a structure of a sensor unit employed in a display device according to embodiments of the present disclosure.

FIG. 3 is a cross-sectional view illustrating a display device according to embodiments of the present disclosure, and FIG. 4 is an exploded perspective view illustrating a structure of a sensor unit employed in a display device according to embodiments of the present disclosure.

Referring to FIGS. 3 and 4, first conductive films 1121a and 1121b may be formed on a substrate 1122. The substrate 1122 may include a flexible material such as polyethylene terephthalate (PET). However, the present disclosure is not limited thereto. The first conductive films 1121a and 1121b may include a first conductive wiring 1121a and a second conductive wiring 1121b which are patterned in a predetermined shape. The first conductive wiring 1121a and the second conductive wiring 1121b may be spaced apart from each other. In addition, the first conductive wiring 1121a and the second conductive wiring 1121b may be formed on the substrate 1122 by using conductive ink, respectively. The first conductive wiring 1121a may be a driving signal line (Tx) and the second conductive wiring 1121b may be a second sensing signal line (R2x). In addition, the first conductive wiring 1121a may be connected to the driving signal line (Tx) and the second conductive wiring 1121b may be connected to the second sensing signal line (R2x). A second conductive film 1125 may be formed on the substrate 1122 on which the first conductive films 1121a and 1121b are formed. A spacer 1123 may be formed between the second conductive film 1125 and the substrate 1122 so that the second conductive film 1125 and the substrate 1122 are spaced apart from each other by a predetermined distance.

The spacer 1123 may include a hollow space and may be disposed at the outer periphery of the second conductive film 1125. When the spacer 1123 is attached to the substrate 1122, the hollow space of the spacer 1123 may be disposed in a central portion of the substrate 1122. The central portion of the substrate 1122 may be referred to as a contact region. In the contact region, the first conductive films 1121a and 1121b may be exposed by the hollow space of the spacer 1123. Only when a gap between the first conductive films 1121a and 1121b and the second conductive film 1125 is maintained by the spacer 1123 and a force is applied, the first conductive films 1121a and 1121b and the second conductive film 1125 may be connected. The second conductive film 1125 may include a thin film having conductivity. In addition, the second conductive film 1125 may be formed on the flexible substrate 1122 by using conductive ink. In this case, a surface on which the second conductive film 1125 is formed and a surface on which the first conductive films 1121a and 1121b are formed on the substrate 1122 may be disposed opposite to each other. However, the present disclosure is not limited thereto. Pad units (P1, P2, P3, and P4) may be formed on the second conductive film 1125 and the first sensing signal lines (R1x1, R1x2, R1x3, and R1x4) may be connected to the pad units (P1, P2, P3 and P4), respectively. The first sensing signal lines (R1x1, R1x2, R1x3, and R1x4) may correspond to the number of pads of the pad units (P1, P2, P3, and P4). The pads may be points where the first sensing signal lines (R1x1, R1x2, R1x3, and R1x4) are connected to the second conductive film 1125, respectively. Four pads (P1, P2, P3, and P4) may be formed on the second conductive film 1125. If the second conductive film 1125 has a rectangular shape, the four pads (P1, P2, P3, and P4) may be arranged at positions corresponding to vertexes of the rectangle. However, the present disclosure is not limited thereto, and the number of pads may be at least three. In addition, the four pads (P1, P2, P3, and P4) may not be arranged at each vertex of the second conductive film 1125. A display panel 110 may be disposed on the second conductive film 1125.

The above-described display device 100 may be configured such that the second conductive film 1125 is spaced a predetermined distance apart from the first conductive films 1121a and 1121b disposed on the substrate 1122 by the spacer 1123 without coming into contact therewith. However, when a force is applied to the display panel 110, the second conductive film 1125 may be bent by the force applied to the display panel 110 and the bent second conductive film 1125 may come into contact with the first conductive wiring 1121a and the second conductive wiring 1121b. The first conductive wiring 1121a and the second conductive wiring 1121b may be electrically connected to each other by the second conductive film 1125 which is in contact with the first conductive wiring 1121a and the second conductive wiring 1121b. In a state where the second conductive film 1125 is in contact with the first conductive wiring 1121a and the second conductive wiring 1121b by using turn-on/turn-off of the first sensing signal line and the second sensing signal line, a first driving signal may be transferred to the second conductive film 1125 and a second driving signal (TD2) may be transferred to the second conductive wiring 1121b through the first conductive wiring 1121a.

Figure 5:
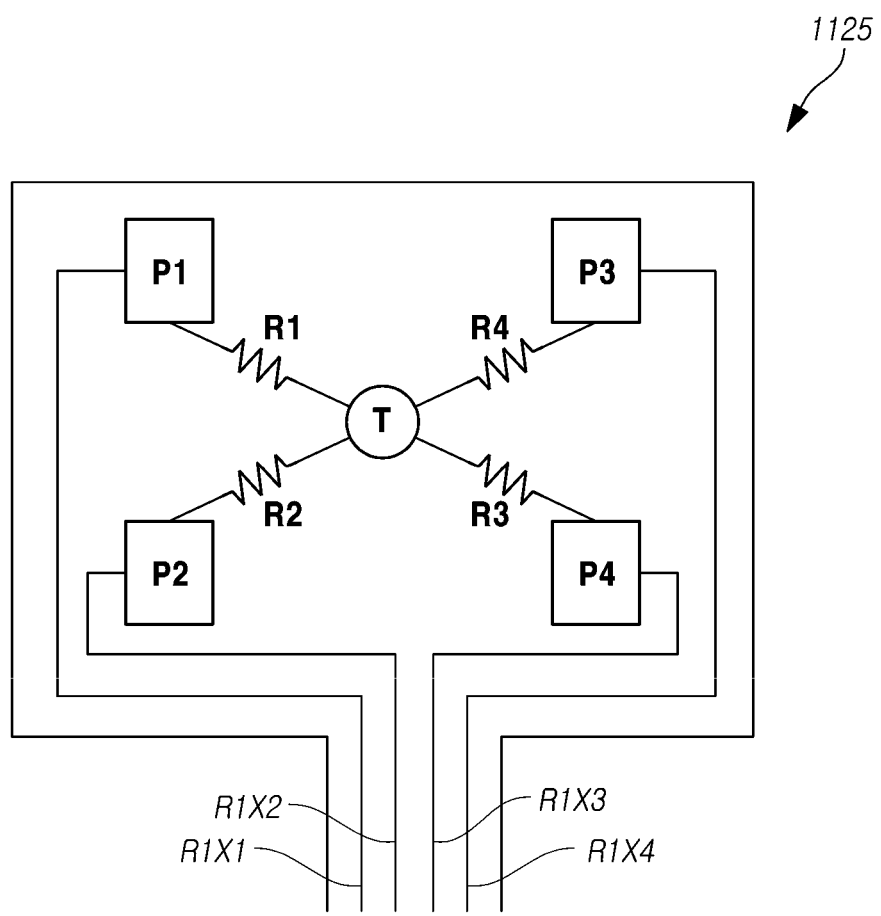
FIG. 5 is a plan view illustrating an embodiment of a conductive film employed in a sensor unit shown in FIG. 4.

FIG. 5 is a plan view illustrating an embodiment of a second conductive film employed in a sensor unit shown in FIG. 4.

Referring to FIG. 5, a second conductive film 1125 may have a rectangular shape having a predetermined area. The second conductive film 1125 may be formed of conductive ink. Four pads (P1, P2, P3, and P4) may be arranged at vertexes of the rectangle of the second conductive film 1125, respectively. The four pads (P1, P2, P3, and P4) are exemplary, and the number of pads may be at least three. Further, four sensing signal lines (R1x1, R1x2, R1x3, and R1x4), which are connected to the four pads (P1, P2, P3, and P4), respectively, may be first sensing signal lines. When the second conductive film 1125 is formed on a flexible substrate, each of the pads (P1, P2, P3, and P4) may be formed on a rear surface of a surface on which the second conductive film 1125 is formed, and a through hole (not shown) may be formed in the substrate, so that each of the pads (P1, P2, P3, and P4) may be connected to the conductive film through the through hole. However, the connection between the pads (P1, P2, P3, and P4) and the second conductive film 1125 is not limited thereto.

When one point (T) of the display panel 110 is touched, the second conductive film 1125 comes into contact with first conductive films 1121a and 1121b disposed under the second conductive film 1125. A second conductive wiring 1121*b* of the first conductive films 1121*a* and 1121*b* is not connected to a second sensing signal line (R2*x*), so that a first driving signal transferred to a first conductive wiring 1121*a* is not transferred to the second conductive wiring 1121*b* but is transferred to the second conductive film 1125 which is contacted by the touch. In this case, since a current tends to flow to the smallest resistance in terms of characteristics, the first driving signal transferred to the second conductive film 1125 may be transferred through four paths corresponding to the four pads in the touch point. Resistance is formed in each of the four paths formed by the second conductive film 1125, so that first resistance (R1) may be formed between a first pad (P1) and a touch point (T), second resistance (R2) may be formed between a second pad (P2) and the touch point (T), third resistance (R3) may be formed between a third pad (P3) and the touch point (T), and fourth resistance (R4) may be formed between a fourth pad (P4) and the touch point (T). Since magnitude of resistance is proportional to a length, the magnitude of the resistance may correspond to a distance of each path.

Four sensing signals may be output through four sensing signal lines by the first to fourth resistance (R1 to R4), and the touch controller 122 may compare voltages of the sensing signals to calculate resistance formed between each of the pads and the touch point (T). In addition, the touch controller 122 may calculate a distance between the touch point and each of the pads (P1, P2, P3, and P4) by using the calculated magnitude of resistance, and obtain position information relating to the touch point by using distances between four touch points and the pads (P1, P2, P3, and P4). When position information relating to a touch point is sensed, a touch can be recognized in a humid environment due to a resistive film manner using a resistance.

Figure 6:
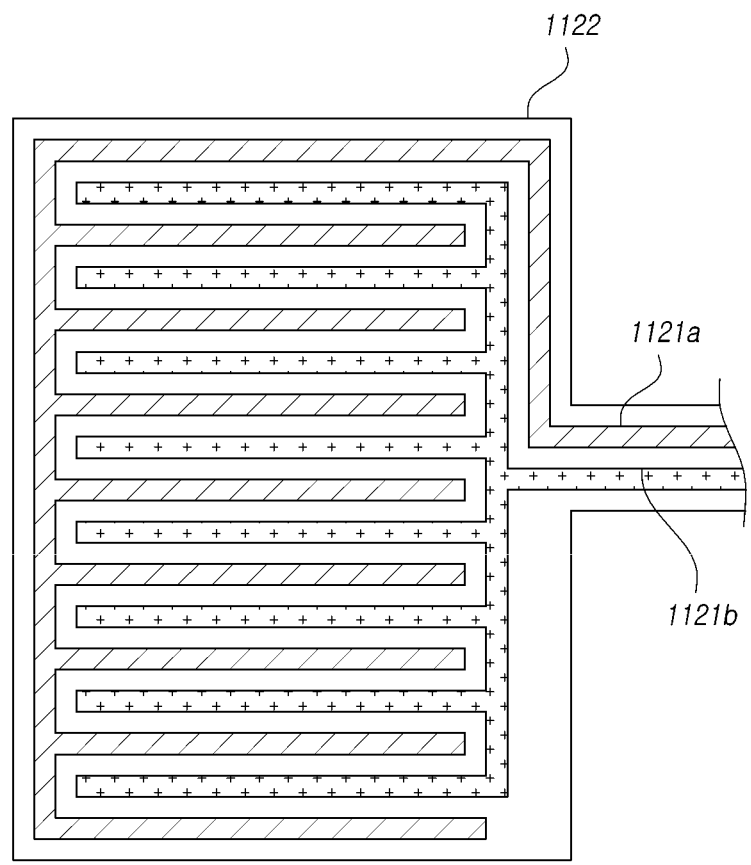
FIG. 6 is a plan view illustrating an embodiment of a substrate employed in a sensor unit shown in FIG. 4 and a conductive layer disposed on the substrate.

FIG. 6 is a plan view illustrating an embodiment of a substrate employed in a sensor unit shown in FIG. 4 and a conductive layer disposed on the substrate.

Referring to FIG. 6, a substrate 1122 may be a flexible substrate. However, the present disclosure is not limited thereto. First conductive films 1121*a* and 1121*b* may include a first conductive wiring 1121*a* and a second conductive wiring 1121*b*. The first conductive wiring 1121*a* and the second conductive wiring 1121*b* may be patterned in a predetermined shape and spaced apart from each other. The first conductive wiring 1121*a* and the second conductive wiring 1121*b* may be patterned in a comb-like shape, respectively. However, the present disclosure is not limited thereto. The first conductive wiring 1121*a* and the second conductive wiring 1121*b* may be formed of conductive ink. When the first conductive wiring 1121*a* and the second conductive wiring 1121*b* are spaced apart from each other and thus a first conductive film is not connected, that is, when no touch occurs, a signal is not transferred from the first conductive wiring 1121*a* to the second conductive wiring 1121*b*. Therefore, the second conductive wiring 1121*b* may transfer a sensing signal only at the time of a touch. The first conductive wiring 1121*a* and the second conductive wiring 1121*b* are patterned in a comb-like shape to allow touch occurrence to be easily detected.

A second conductive film 1125 may come into contact with the first conductive films 1121*a* and 1121*b* including the first conductive wiring 1121*a* and the second conductive wiring 1121*b* by a force applied to a touch point when a display panel 110 is touched. The first conductive wiring 1121*a* may be a driving signal line. In addition, the first conductive wiring 1121*a* may be connected to a driving signal line. The second conductive wiring 1121*b* may be a second sensing signal line. In addition, the second conductive wiring 1121*b* may be connected to a second sensing signal line. When a second driving signal is transferred to the first conductive wiring 1121*a*, the second conductive wiring 1121*b* or a second sensing signal line (R2*x*) may be connected to a touch driver 121. In this case, first sensing signal lines (R1*x*1, R1*x*2, R1*x*3, and R1*x*4) connected to the second conductive film 1125 may not be connected to the touch driver 121. Although the second conductive film 1125 is in contact with the first conductive wiring 1121*a* and the second conductive wiring 1121*b*, the first sensing signal lines (R1*x*1, R1*x*2, R1*x*3, and R1*x*4) are not connected to the touch driver 121 and are thus opened, so that the second driving signal is not transferred to the second conductive film 1125. When the second sensing line (R2*x*) is connected and thus the first conductive wiring 1121*a* and the second conductive wiring 1121*b* are connected, the second driving signal transferred to the first conductive wiring 1121*a* is transferred to the second conductive wiring 1121*b* through the second conductive film 1125. The contact area between the second conductive film 1125 and the first conductive wiring 1121*a* or the second conductive wiring 1121*b* is changed according to a force applied to a touch point, so that a second sensing signal corresponding to the force applied to the touch point may be transferred to the second sensing signal line (R2*x*). In addition, conductive ink has resistance, the magnitude of which changes according to a force applied thereto, so that a second sensing signal corresponding to the applied force may be output. The intensity of the second sensing signal may be changed according to resistance, so that the sensor unit 120 may sense position information relating to a touch point and a force applied thereto even in a humid environment or an underwater environment, unlike a capacitance manner.

Figure 7:
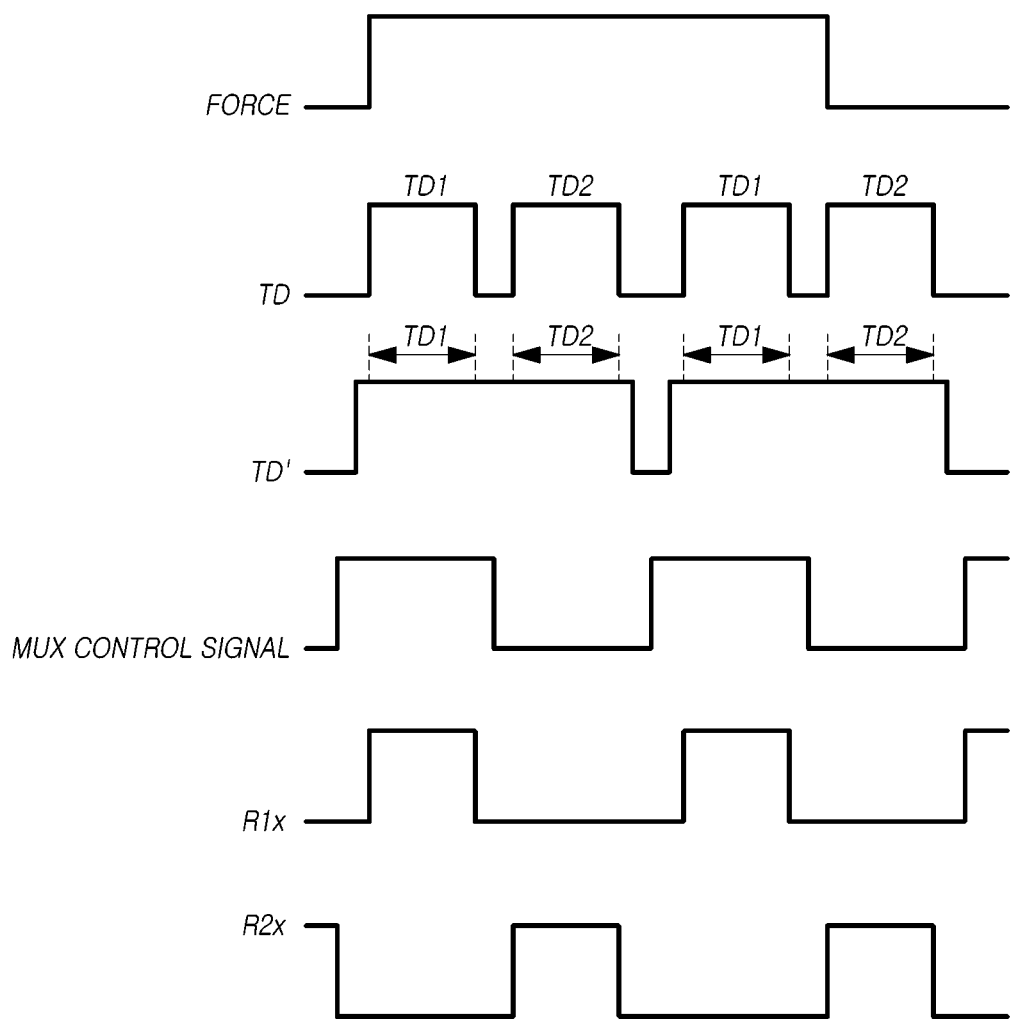
FIG. 7 is a waveform view illustrating an embodiment of a driving signal input to a sensor unit in a display device according to embodiments of the present disclosure.

FIG. 7 is a waveform view illustrating an embodiment of a driving signal input to a sensor unit in a display device according to embodiments of the present disclosure.

Referring to FIG. 7, in relation to a driving signal (TD), a first driving signal (TD1) and a second driving signal (TD2) may be alternately generated. When the first driving signal (TD1) is transferred, first sensing signal lines (R1*x*1, R1*x*2, R1*x*3 and R1*x*4) may be connected to a touch driver 121 by a mux control signal, and when the second driving signal (TD2) is transferred, a second sensing signal line (R2*x*) may be connected to the touch driver 121. When the first sensing signal lines (R1*x*1, R1*x*2, R1*x*3 and R1*x*4) are connected to the touch driver 121 by the mux control signal, a first sensing signal (R1*x*) is output through the first sensing signal lines (R1*x*1, R1*x*2, R1*x*3 and R1*x*4), and when the second sensing signal line (R2*x*) is connected to the touch driver 121, a second sensing signal (R2*x*) may be output through the second sensing signal line (R2*x*).

In addition, the first driving signal (TD1) and the second driving signal (TD2) may be repeated for a very short time, and may be repeatedly transferred several times during one touching time. However, the present disclosure is not limited thereto. When the driving signal (TD) is repeatedly generated and the first sensing signal lines (R1*x*1, R1*x*2, R1*x*3, and R1*x*4) and the second sensing signal line (R2*x*) are selectively connected to the touch driver 121 by the mux control signal, a driving signal transferred from the first conductive wiring 1121*a* to the second conductive film 1125 may be referred to as a first driving signal (TD1) and a driving signal transferred from the first conductive wiring 1121*a* to the second conductive wiring 1121*b* may be referred to as a second driving signal (TD2).

Further, although the first driving signal (TD1) and the second driving signal (TD2) are shown to have the same voltage, the present disclosure is not limited thereto.

Figure 8:
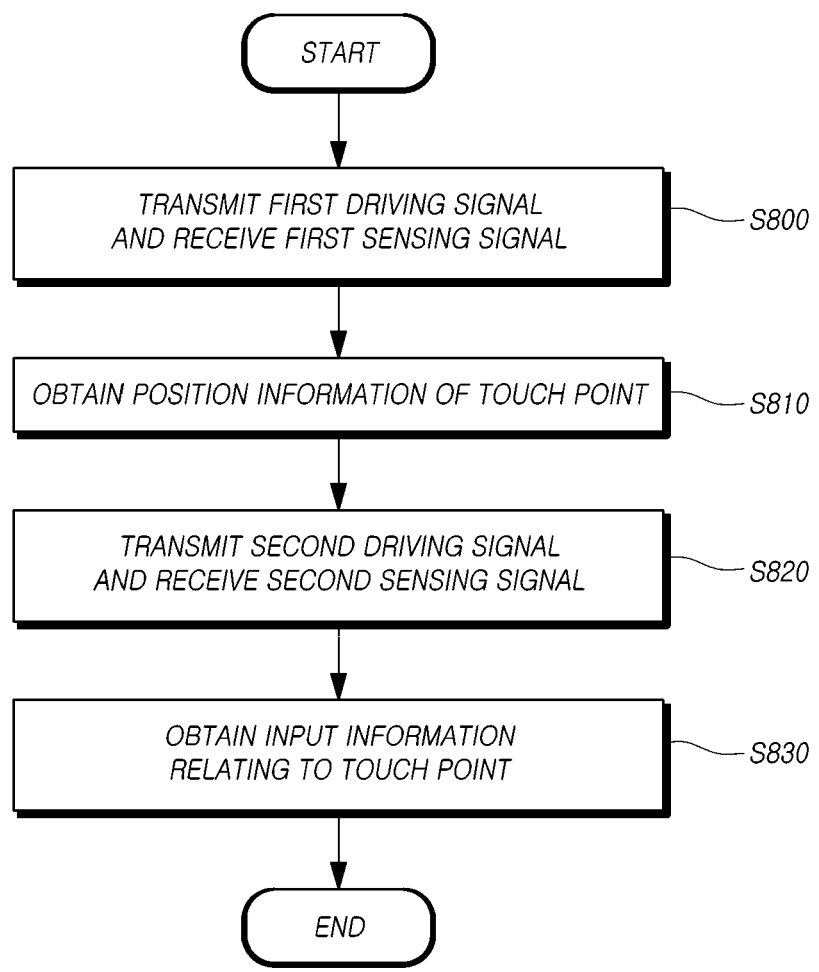
FIG. 8 is a flowchart illustrating an embodiment of a method for driving a touch sensor configured to sense a touch in a sensor unit employed in a display device according to embodiments of the present disclosure.

FIG. 8 is a flowchart illustrating an embodiment of a method for driving a touch sensor configured to sense a touch in a sensor unit employed in a display device according to embodiments of the present disclosure.

Referring to FIG. 8, in a method for driving a touch sensor, a first driving signal (TD1) may be transferred from a second sensor 120b to a first sensor 120a in response to a force applied to a touch point, and a first sensing signal (R1x) may be transferred from the first sensor 120a in response to the first driving signal (TD1) (S800). The first sensing signal (R1x) transferred from the first sensor 120a may include at least three sensing signals. When the first driving signal (TD1) is transferred, first sensing signal lines (R1x1, R1x2, R1x3, and R1x4) may be connected to a touch driver 121 and the first sensor 120a may output the first sensing signal (R1x) corresponding to the first driving signal (TD1) to the touch driver 121.

Position information relating to a touch point may be obtained in response to the first sensing signal (S810). The first sensing signal may be output corresponding to magnitude of resistance in response to the first driving signal. In addition, the first sensing signal may include at least three sensing signals, and each of the sensing signals may include information corresponding to distances from a touch point to at least three different pads. The information corresponding to the distances may correspond to magnitude of resistance formed between each of the pads and the touch point. In addition, a voltage of the first sensing signal may be determined by the first driving signal, and magnitude of resistance from the touch point to each of the pads may be calculated through the voltage of the sensing signal. Since the magnitude of resistance is related to a distance, distances between the touch point and the pads may be calculated through the calculated magnitude of resistance, and the position of the touch point may be calculated using the calculated distances. The distances between the touch point and the pads may be used to obtain position information by a method such as triangulation. In addition, the obtainment of the position information may be performed by a touch controller 122 by using a first sensing signal transferred to the touch driver 121. However, the present disclosure is not limited thereto.

A second driving signal (TD2) may be transferred to the second sensor 120b and a second sensing signal (R2x) corresponding to a touch point corresponding to the second driving signal (TD2) may be transferred from the second sensor 120b (S820). When the second driving signal (TD2) is transferred from the touch driver 121 to a driving signal line, a second sensing signal line (R2x) may be connected to the touch driver 121 and the second sensor 120b may output the second sensing signal (R2x) corresponding to the second driving signal.

The magnitude information on a force applied to a touch point corresponding to the second sensing signal (R2x) may be obtained (S830). The second sensing signal may be output corresponding to magnitude of resistance in response to the second driving signal. In the second sensor 120b, a first conductive wiring 1121a and a second conductive wiring 1121b are disposed. When a touch occurs, a second conductive film 1125 included in the first sensor 120a comes into contact with the first conductive wiring 1121a and the second conductive wiring 1121b. Therefore, the contact area between the second conductive film 1125 and the first conductive wiring 1121a or the second conductive wiring 1121b may be changed at a position corresponding to a touch point corresponding to a force applied to the touch point at the time of a touch. The voltage of the second sensing signal (R2x) output from the second sensor 120b is changed corresponding to the changed area and the contact area can be thus grasped. Since the contact area corresponds to a magnitude of the force applied at the time of a touch, the second sensing signal (R2x) may be used to calculate a force magnitude applied to a touch point when the display panel 110 is touched. In addition, the first conductive wiring 1121a and the second conductive wiring 1121b may be formed by conductive ink. The conductive ink has resistance, the magnitude of which changes according to a force magnitude applied thereto, so that a voltage of the second sensing signal (R2x) may be changed corresponding to a force magnitude applied to a touch point. Accordingly, intensity of the second sensing signal (R2x) may correspond to a force magnitude applied to a touch point at the time of a touch.

The touch controller 122 is shown as receiving the second driving signal (TD2) after obtaining position information, but the present disclosure is not limited thereto. The touch controller 122 may sequentially receive the first driving signal (TD1) and the second driving signal (TD2), and then grasp position information relating to a touch point and magnitude information on a force applied thereto according to the first sensing signal (R1x) corresponding to the first driving signal (TD1) and the second sensing signal (R2x) corresponding to the second driving signal (TD2). When position information is grasped first, more accurate information on a force magnitude can be grasped. However, position information can be grasped after force magnitude information is grasped first. In addition, the first driving signal (TD1) and the second driving signal (TD2) are shown to have the same voltage level, but the present disclosure is not limited thereto.

In addition, since a touch position and a force applied at the time of a touch are sensed by using a resistance film manner, the touch can be recognized in a humid environment or an underwater environment, so that touch input can be performed even underwater.

When a display device includes a flexible display panel, a touch point may be determined according to a force applied to the touch point, so that position information relating to the touch point and information on a force applied at the time of a touch may be obtained in the flexible display panel.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiments. The scope of the present disclosure shall be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device comprising:
    a sensor unit including a first sensor and a second sensor, the first sensor including at least three first sensing signal lines, each of which is configured to output a respective first sensing signal based on a first driving signal, and the second sensor including a driving signal line and a second sensing signal line and configured to output a second sensing signal through the second sensing signal line based on a second driving signal applied to the driving signal line;
    a touch drive circuit configured to apply the first driving signal and the second driving signal to the driving signal line, and receive a first sensing signal and the second sensing signal from a first sensing signal line and the second sensing signal line, respectively;
    a touch controller configured to control the touch drive circuit and generate position information and force magnitude information relating to a touch point based on a first sensing signal and the second sensing signal; and
    a display panel disposed on the sensor unit and configured to display an image,
    wherein the driving signal line and the second sensing signal line are electrically separated from each other on a substrate, and each of the driving signal line and the second sensing signal line includes a comb shape.

2. The display device of claim 1, wherein, during a first driving period for sensing the position information with respect to the touch point, the driving signal line and the first sensing signal line are connected to each other and the first driving signal is applied through the driving signal line to a first sensing signal line, and during a second driving period for sensing the force magnitude information with respect to the touch point, the first sensing signal line is at least one of not connected to the driving signal line or floated.

3. The display device of claim 1, wherein the first sensor includes:
    a conductive film which comes into contact with the second sensor when a force is applied to at least one of the conductive film or the second sensor; and
    at least three pad units arranged at at least three points which are different from one another in the conductive film, and the at least three first sensing signal lines are connected to the at least three pad units respectively.

4. A display device comprising:
    a sensor unit including a first sensor and a second sensor, the first sensor including at least three first sensing signal lines, each of which is configured to output a respective first sensing signal based on a first driving signal, and the second sensor including a driving signal line and a second sensing signal line and configured to output a second sensing signal through the second sensing signal line based on a second driving signal applied to the driving signal line;
    a touch drive circuit configured to apply the first driving signal and the second driving signal to the driving signal line, and receive a first sensing signal and the second sensing signal from a first sensing signal line and the second sensing signal line, respectively;
    a touch controller configured to control the touch drive circuit and generate position information and force magnitude information relating to a touch point based on a first sensing signal and the second sensing signal; and
    a display panel disposed on the sensor unit and configured to display an image,
    wherein the first sensor includes:
        a conductive film which comes into contact with the second sensor when a force is applied to at least one of the conductive film or the second sensor; and
        at least three pad units arranged at at least three points which are different from one another in the conductive film, and the at least three first sensing signal lines are connected to the at least three pad units respectively,
    wherein a spacer having a hollow portion is disposed between the conductive film and the driving signal line and the second sensing signal line.

5. The display device of claim 3, wherein the touch controller detects the position information of the touch point based on impedance values between a point where the conductive film is connected to the second sensor and the at least three pad units.

6. The display device of claim 1, further comprising a mux unit connected to a first sensing signal line and the second sensing signal line, wherein the mux unit is configured to selectively block the first sensing signal line or the second sensing signal line by a mux control signal.

7. The display device of claim 1, wherein the display panel is flexible.

8. The display device of claim 1, wherein the first driving signal is transferred to the first sensor when the first sensor and the second sensor contact one another.

9. The display device of claim 3, wherein the conductive film is configured to contact both the driving signal line and the second sensing signal line upon a force applied onto at least one of the first sensor or the second sensor.

* * * * *